Patented Mar. 13, 1951

2,544,826

UNITED STATES PATENT OFFICE

2,544,826

ANTHELMINTIC FEED COMPOSITION

Arthur Henry Craige, Jr., Riverdale, Md., assignor, by mesne assignments, to The Dow Chemical Company, Midland, Mich., a corporation of Delaware No Drawing. Original application May 8, 1945, Serial No. 592,729. Divided and this application October 6, 1949, Serial No. 120,000

9 Claims. (Cl. 167—53.1)

The present invention relates to novel compositions for the elimination of internal parasites from the alimentary tract of domestic animals and fowl. More particularly, it relates to stock and poultry feeds containing at least one of the compounds represented by the following general formula:

in which Y and Y' represent phenyl radicals each having at least one halogen substituent and at least one hydroxy substituent.

In accordance with the present invention, it has been discovered that feed compositions containing in proper amounts a compound as illustrated by the above formula are extremely efficient anthelmintics when consumed by animals or fowl infested with worms.

It is an advantage of the present invention that my compositions possess a high therapeutic index, i. e., a relatively low toxicity at the effective anthelmintic doses.

While my compositions are generally useful for the control of internal parasitic infestations of the alimentary tract of stock and poultry, it is an advantage that they are especially effective in the treatment of tapeworm infestations.

The active ingredients of my feed compositions can broadly be classified as diphenylmethanes wherein each of the phenyl group contains at least one halogen substituent and at least one hydroxy substituent. I have found that at least one halogen substituent and at least one hydroxy substituent must be present on the phenyl groups, on the other hand, other substituents, i. e., alkyl groups may also be present without destroying their anthelmintic activity.

Included among the compounds useful in accordance with my invention are those set forth hereinafter.

My preferred active ingredients are those compounds represented by the following formula:

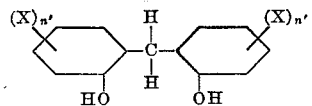

in which X represents a halogen, selected from the group consisting of chlorine and bromine and $n'$ represents 1, 2, 3, or 4 and salts of such compounds. Specific compounds falling within this class include 2,2' - dihydroxy - 5,5' - dichlorodiphenylmethane, 2,2' - dihydroxy-5,5'-dibromodiphenylmethane, 2,2' - dihydroxy - 3,5,3',5'-tetrachlorodiphenylmethane, 2,2'-dihydroxy-3,5,3',5'-tetrabromodiphenylmethane, 2,2' - dihydroxy - 3,5,6,3',5',6' - hexachlorodiphenylmethane, 2,2' - dihydroxy - 3,4,5,6,3',4',5',6'-octachlorodiphenylmethane, 2,2' - dihydroxy-5,5'-dibromo-3,6,3',6'-tetrachlorodiphenylmethane, 2,2' - dihydroxy - 3,5,6,3',5',6' - hexabromodiphenylmethane, and their salts including alkali metal, alkaline earth metal, and heavy metal salts.

As previously indicated the phenyl groups may have in addition to the halogen and hydroxy groups on the ring an alkyl group and still be useful as additions to feedstuffs in accordance with my invention. Among such alkyl substituted compounds may be included 2,2'-dihydroxy-4,4' - dimethyl - 5,5'-dichlorodiphenyl-methane, 2,2' - dihydroxy - 4,4' - dimethyl - 3,5,3',5'-tetrachlorodiphenylmethane, 2,2' - dihydroxy-4,4'-dimethyl - 3,5,6,3',5',6' - hexachlorodiphenylmethane and related compounds having the methyl group in some position other than 4 or in more than one position as well as those wherein some or all of the chlorines are replaced by bromine, and those wherein the methyl groups are replaced by a lower alkyl group such as ethyl, propyl, butyl or amyl.

Among those compounds having more than one hydroxy group on the phenyl rings may be included 2,4,2',4' - tetrahydroxy - 5,5'-dichlorodiphenylmethane, 2,4,6,2',4',6' - hexahydroxy-5,5'-dichlorodiphenylmethane, 2,4,2',4'-tetrahydroxy-3,5,3',5'-tetrachlorodiphenylmethane and the corresponding bromo compounds.

It is to be distinctly understood that my feed compositions are useful for combating internal parasites of the gastrointestinal tract of any domestic animal or fowl.

The percentage of active ingredient in my feed compositions can be varied. It is only necessary that the active ingredient constitute a proportion such that an adequate dose will be obtained by the animals consuming the food. The amount can be varied from only a fraction of a percent to several percent. For example, a poultry mash containing 0.1% can be effectively employed or one containing 10% can be effectively employed.

It is obvious that the preceding descriptions are intended to be illustrative only and they may be varied or modified to a considerable extent without departing from the spirit of the invention or sacrificing the advantages thereof. I do not, therefore, intend to limit my invention to the specific embodiments herein set forth except as indicated in the appended claims.

This application is a division of my co-pending application, Ser. No. 592,729, filed May 8, 1945.

My feed compositions are prepared by mixing the diphenylmethane with any suitable animal feed or feed concentrate.

Having thus described my invention, I claim:

1. A poultry feed containing from 0.1% to 10% of 2,2'-dihydroxy-5,5'-dichlorodiphenylmethane.

2. A poultry feed containing from 0.1% to 10% of 2,2'-dihydroxy-5,5'-dibromodiphenylmethane.

3. A poultry feed containing from 0.1% to 10% of 2,2' - dihydroxy - 3,5,6,3",5',6'-hexachlorodiphenylmethane.

4. An animal and poultry feed containing a minor proportion of a substance represented by the following formula:

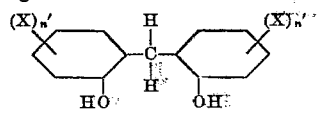

in which X represents a halogen selected from the group consisting of chlorine and bromine, said halogen substituents being arranged symmetrically, and $n'$ represents a whole integer of the group consisting of 1, 2, 3, and 4.

5. An animal and poultry feed containing a minor proportion of a substance represented by the following formula:

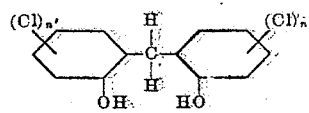

in which the chlorine substituents are arranged symmetrically, and $n'$ represents a whole integer of the group consisting of 1, 2, 3, and 4.

6. An animal and poultry feed containing a minor proportion of a substance represented by the following formula:

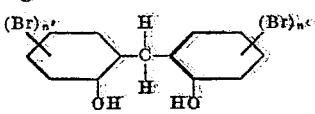

in which the bromine substituents are arranged symmetrically, and $n'$ represents a whole integer of the group consisting of 1, 2, 3, and 4.

7. A medicated poultry and animal feed effective in the control of internal parasites containing a minor proportion of 2,2'-dihydroxy-5,5'-dichlorodiphenylmethane.

8. A medicated poultry and animal feed effective in the control of internal parasites containing a minor proportion of 2,2'-dihydroxy-5,5'-dibromodiphenylmethane.

9. A medicated poultry and animal feed effective in the control of internal parasites containing a minor proportion of 2,2'-dihydroxy-3,5,6,3',5',6'-hexachlorodiphenylmethane.

ARTHUR HENRY CRAIGE, Jr.

REFERENCES CITED

The following references are of record in the file of this patent:

UNITED STATES PATENTS

| Number | Name | Date |
|---|---|---|
| 1,587,077 | Kropp | June 11, 1926 |
| 1,658,719 | Hardy | Feb. 7, 1928 |
| 1,707,181 | Weiler et al. | Mar. 26, 1929 |
| 1,839,970 | Konantz | Jan. 5, 1932 |
| 2,091,840 | Turnbow | Aug. 31, 1937 |
| 2,250,480 | Gump | July 29, 1941 |
| 2,272,267 | Gump | Feb. 10, 1942 |
| 2,280,340 | Miller | Apr. 21, 1942 |
| 2,334,408 | Gump et al. | Nov. 16, 1943 |
| 2,353,725 | Gump | July 18, 1944 |

OTHER REFERENCES

Cade: Soap and Sanitary Chemicals, volume 20, Feb. 1944, pages 111 to 115.